United States Patent
Kim et al.

(10) Patent No.: US 11,183,925 B2
(45) Date of Patent: Nov. 23, 2021

(54) DC-TO-DC CONVERTER

(71) Applicants: Hyundai Motor Company, Seoul (KR); KIA Motors Corporation, Seoul (KR)

(72) Inventors: Jung Hwi Kim, Hwaseong-si (KR); Jung Mo Yu, Seoul (KR); Yong Jae Lee, Hwaseong-si (KR); Jae Ho Hwang, Daejeon (KR); Joo Young Park, Yongin-si (KR); Jae Hyeon Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/036,712

(22) Filed: Sep. 29, 2020

(65) Prior Publication Data

US 2021/0313877 A1 Oct. 7, 2021

(30) Foreign Application Priority Data

Apr. 1, 2020 (KR) .................. 10-2020-0040004

(51) Int. Cl.
*H02M 3/07* (2006.01)
*H02M 1/08* (2006.01)
*H02M 1/00* (2006.01)

(52) U.S. Cl.
CPC ............... *H02M 3/07* (2013.01); *H02M 1/08* (2013.01); *H02M 1/0009* (2021.05)

(58) Field of Classification Search
CPC ......... H02M 3/07; H02M 1/08; H02M 1/0009
See application file for complete search history.

(56) References Cited

U.S. PATENT DOCUMENTS 7,746,041 B2 6/2010 Xu et al.
2018/0183113 A1* 6/2018 Moteki .................. F02N 11/08

FOREIGN PATENT DOCUMENTS

JP 5975687 B2 8/2016
JP 6223609 B2 11/2017

* cited by examiner

*Primary Examiner* — Sibin Chen
(74) *Attorney, Agent, or Firm* — Morgan, Lewis & Bockius LLP (57) ABSTRACT

A flying DC-to-DC converter has a capacitor protection function of preventing a flying capacitor from overheating. The flying DC-to-DC converter estimates the temperature of a capacitor on the basis of a switching duty and an inductor current determined according to a result of comparison between an output voltage and a voltage instruction value, and determines whether to perform de-rating.

12 Claims, 10 Drawing Sheets

DC-TO-DC CONVERTER

CROSS REFERENCE TO RELATED APPLICATION

The present application claims priority to Korean Patent Application No. 10-2020-0040004, filed Apr. 1, 2020, the entire contents of which are incorporated herein for all purposes by this reference.

TECHNICAL FIELD

The present disclosure relates to a DC-to-DC converter and, more particularly, to a flying DC-to-DC converter having a capacitor protection function of preventing a flying capacitor from overheating.

BACKGROUND

A DC-to-DC converter that converts a source of direct current (DC) from one voltage level to another is widely used in various electronic devices.

Regarding a conventional DC-to-DC converter, a technique of converting the voltage of a DC supply to another voltage by controlling the amount of energy accumulation and the amount of energy discharge of an inductor through an on-off operation of a semiconductor switch is known. This type of DC-to-DC converter has a disadvantage that the inductor is large and heavy.

To solve this problem, i.e., to reduce the size and weight of an inductor, the inductance of the inductor needs to be reduced. To this end, a technique of reducing a voltage applied to the inductor by charging and discharging a capacitor has been developed.

Among many DC-to-DC converters using such a technique, there is a DC-to-DC converter that includes a series of switches and a flying capacitor disposed between two switches of the series of switches.

Such a DC-to-DC converter with a flying capacitor has a problem in that its control is difficult because the voltage of the flying capacitor needs to be maintained at a constant level.

In particular, the capacitor characteristics deteriorate as the temperature increases, and when the capacitor characteristics deteriorate, failures such as a short-circuit fault or a disconnection occur. Therefore, in the case of a flying DC-to-DC converter, an over-temperature prevention function is required to manage the temperature of the flying capacitor that is used to improve the system reliability below a certain level.

The over-temperature prevention can be achieved by attaching a temperature sensor to the capacitor and adjusting the output voltage of the capacitor on the basis of the measured temperature. However, this approach incurs additional cost for designing the temperature sensor and associated circuits.

The foregoing is intended merely to aid in the understanding of the background of the present disclosure, and is not intended to mean that the present disclosure falls within the purview of the related art that is already known to those skilled in the art.

SUMMARY

One objective of the present disclosure is to provide a flying DC-DC converter having a capacitor protection function of preventing the temperature of a flying capacitor thereof from excessively rising.

In order to accomplish the objective, according to one aspect of the present disclosure, there is provided a DC-to-DC converter including: a first capacitor; a first switch, a second switch, a third switch, and a fourth switch connected in series between a first electrode and a second electrode of the first capacitor; a second capacitor having a first electrode and a second electrode respectively connected to a connection node of the first switch and the second switch and a connection node of the third switch and the fourth switch; an inductor connected to a connection node of the second switch and the third switch at a first terminal thereof; and a controller that determines a control duty of the first to fourth switches, estimates a temperature of the second capacitor on the basis of the control duty and a detection current that is an actually measured inductor current, and determines whether to perform de-rating according to the temperature of the second capacitor.

In one embodiment of the present disclosure, the controller generates a current instruction value on the basis of a result of comparison between a first detection voltage that is a measured output voltage of the DC-to-DC converter and an output voltage instruction value that is a target voltage to be output from the DC-to-DC converter, determines the control duty of the first to fourth switches on the basis of a result of comparison between the detection current and the current instruction value, calculates a root mean square (RMS) current of the second capacitor on the basis of the control duty and the detection current, and estimates the temperature of the second capacitor on the basis of the calculated RMS current. The output voltage is a voltage between the first electrode and the second electrode of the first capacitor or a voltage between a second terminal of the inductor and a connection node of the first capacitor and the fourth switch.

In one embodiment of the present disclosure, the DC-to-DC converter may further include a voltage sensor for obtaining the measured output voltage.

In one embodiment of the present disclosure, the controller may perform de-rating by imposing a limitation on the current instruction value when the estimated temperature of the second capacitor is higher than a reference temperature that is predetermined.

In one embodiment of the present disclosure, the controller may output a decision of whether to perform the de-rating to an upper-level controller that generates an output voltage instruction value.

In one embodiment of the present disclosure, the controller may calculate an RMS current of the second capacitor using an equation $I_{fl,rms} = I_L \sqrt{2(0.5 - |D_{DM}^* - 0.5|)}$ ($I_{fl,rms}$: the RMS current of the second capacitor, $I_L$: the detection current, and $D_{DM}^*$: the detection duty).

In one embodiment of the present disclosure, the controller may include: a voltage controller that generates a current instruction value that is an inductor current set to flow through the inductor according to a difference between the first detection voltage and an output voltage instruction value; a current controller that generates a first control voltage instruction value according to a difference between the current instruction value and the detection current; and a flying capacitor voltage controller that generates a second control voltage instruction value according to a difference between the second detection voltage and the second voltage instruction value; and a capacitor protector that calculates an RMS current of the second capacitor on the basis of the detection current and the control duty obtained by dividing the first control voltage instruction value by the output voltage, estimates the temperature of the second capacitor on the basis of the calculated RMS current, and determines whether to perform the de-rating according to the temperature of the second capacitor.

In one embodiment of the present disclosure, the capacitor protector may include: a divider that calculates the control duty by dividing the first control voltage instruction value by the output voltage; a current calculator that calculates the RMS current of the second capacitor on the basis of the control duty and the detection current; a temperature estimator that estimates the temperature of the second capacitor according to the estimated RMS current of the second capacitor; and an output determiner that determines whether to perform the de-rating according to a result of comparison between the estimated temperature of the second capacitor obtained by the temperature estimator and the predetermined reference temperature.

In one embodiment of the present disclosure, when the output determiner determines to perform the de-rating, the capacitor protector may further include a limiter that imposes a limitation on the current instruction value output from the voltage controller and provides a limited current instruction value to the current controller.

In one embodiment of the present disclosure, the output determiner may output a decision of whether to perform the de-rating to an upper-level controller that generates the output voltage instruction value.

In one embodiment of the present disclosure, the current calculator may calculate the RMS current of the second capacitor using an equation $I_{ft,rms}=I_L\sqrt{2(0.5-|D_{DM}*-0.5|)}$ ($I_{ft,rms}$: the RMS current of the second capacitor, $I_L$: the detection current, $D_{DM}*$: the detection duty).

In one embodiment of the present disclosure, the DC-to-DC converter may further include a current sensor for obtaining the actually measured inductor current.

According to the present disclosure, the DC-DC converter can estimate the temperature of the flying capacitor by calculating the current RMS value of the flying capacitor on the basis of the inductor current and the switching duty of the flying DC-DC converter even when there is no temperature sensor provided.

Accordingly, with this configuration of the DC-DC converter, it is possible to prevent overheating of the flying capacitor without additional cost caused by adding a temperature sensor or the like and to secure stability and reliability of control through the overheating protection of the flying capacitor.

The effects and advantages that can be achieved by the present disclosure are not limited to the ones mentioned above, and other effects and advantages which are not mentioned above but can be achieved by the present disclosure can be clearly understood by those skilled in the art from the following description.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Hereinafter, DC-to-DC converters according to various embodiments of the present disclosure will be described in detail with reference to the accompanying drawings.

Figure 1:
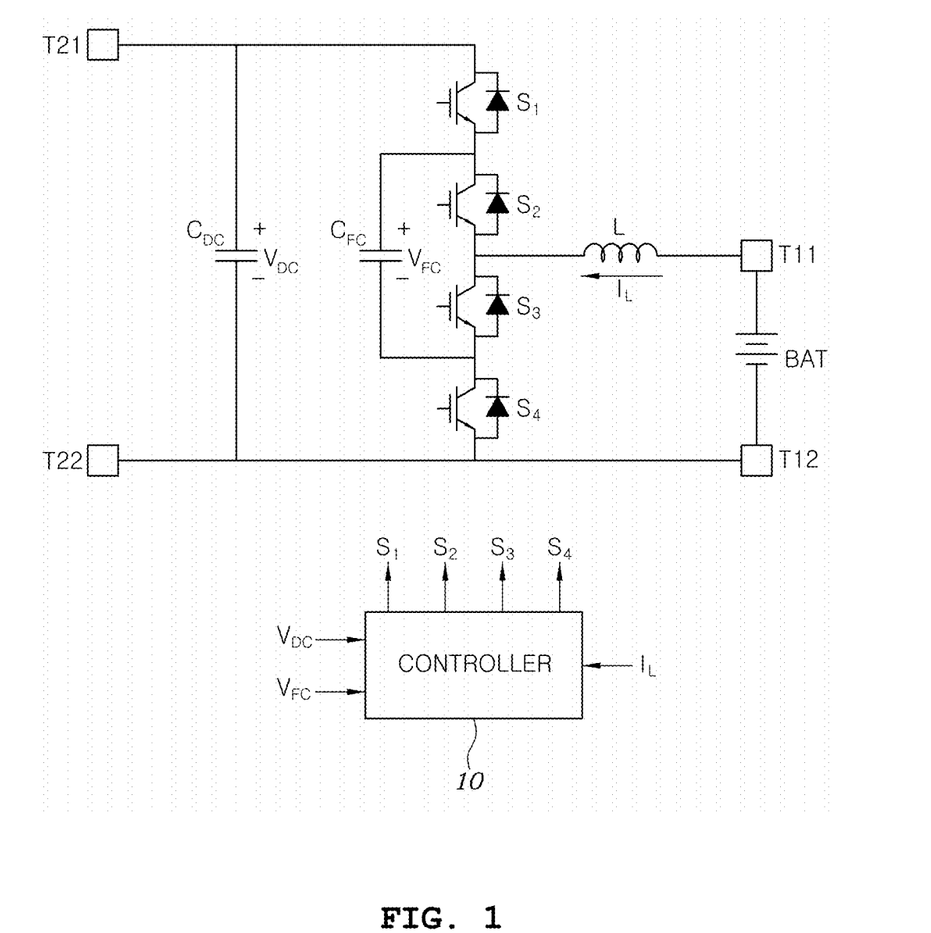
FIG. 1 is a circuitry diagram illustrating a DC-to-DC converter according to one embodiment of the present disclosure.

FIG. 1 is a circuit diagram of a DC-to-DC converter according to one embodiment of the present disclosure.

Referring to FIG. 1, a DC-to-DC converter according to one embodiment of the present disclosure converts a voltage applied between a first input/output (I/O) terminal T11 and a second I/O terminal T12 to a higher voltage, and supplies the raised voltage between a third I/O terminal T21 and a fourth I/O terminal T22. On the contrary, the DC-to-DC converter converts a voltage applied between the third I/O terminal T21 and the fourth I/O terminal T22 to a lower voltage and supplies the generated lower voltage between the first I/O terminal T11 and the second I/O terminal T12. FIG. 1 illustrates an exemplary converter that includes a battery BAT disposed between the first I/O terminal T11 and the second I/O terminal T12, raises the voltage of a supply current of the battery BAT to a higher voltage, and supplies the generated higher voltage between the third I/O terminal T21 and the fourth I/O terminal T22. For example, a load is connected between the third I/O terminal T21 and the fourth I/O terminal T22.

The following description relates to an example in which a voltage resulting from stepping up an output voltage of the battery BAT is applied between the third I/O terminal T21 and the fourth I/O terminal T22. However, those skilled in the art will appreciate that the reverse is possible. That is, the voltage applied between the third I/O terminal T21 and the fourth I/O terminal T22 is stepped down and the resulting lowered voltage is applied between the first I/O terminal T11 and the second I/O terminal T12.

A DC-to-DC converter according to one embodiment of the present disclosure includes: a first capacitor $C_{DC}$ having a first electrode and a second electrode respectively connected to a third I/O terminal T21 and a fourth I/O terminal T22; first to fourth switches $S_1$, $S_2$, $S_3$, and $S_4$ that are connected in series between the first electrode and the second electrode of the first capacitor $C_{DC}$; a second capacitor $C_{FC}$ having a first electrode and a second electrode respectively connected to a connection node between the first switch $S_1$ and the second switch $S_2$ and a connection node between the third switch $S_3$ and the fourth switch $S_4$; an inductor L having a first terminal connected to a connection node between the second switch $S_2$ and the third switch $S_3$; and a controller 10 that controls an on/off state of each of the first to fourth switches $S_1$ to $S_4$. In one example, the outputs $S_1$ to $S_4$ from the controller 10 may be respectively connected to gates of the first to fourth switches $S_1$ to $S_4$.

The first capacitor $C_{DC}$ is a smoothing capacitor connected between the third I/O terminal T21 and the fourth I/O terminal T22. Although not illustrated in FIG. 1, an additional smoothing capacitor may be connected between the first I/O terminal T11 and the second I/O terminal T12.

The first to fourth switches $S_1$ to $S_4$ are connected in series in this order from the first electrode side to the second electrode side of the first capacitor $C_{DC}$. Each of the first to fourth switches $S_1$ to $S_4$ is implemented with an insulated gate bipolar transistor (IGBT). Each of the switches is turned on or off according to an on/off control signal that is input to the gate thereof from the controller 10. Alternatively, each of the first to fourth switches $S_1$ to $S_4$ may be implemented with any arbitrary switching element known in the art, instead of the IGBT.

The second capacitor $C_{FC}$ is a flying capacitor in which the first electrode and the second electrode thereof are respectively connected to the connection node between the first switch $S_1$ and the second switch $S_2$ and the connection node between the third switch $S_3$ and the fourth switch $S_4$.

Although not illustrated in the drawings, the DC-to-DC converter according to one embodiment of the present disclosure may include a plurality of sensors for detecting internal circuitry information that is used by the controller 10 to generate the on/off control signal for each of the first to fourth switches $S_1$ to $S_4$. The plurality of sensors may include a voltage sensor for measuring the voltage between the first I/O terminal T11 and the second I/O terminal T12 or the voltage $V_{DC}$ between the third I/O terminal T21 and the fourth I/O terminal T22, a voltage sensor for measuring the voltage $V_{FC}$ of the second capacitor $C_{FC}$, and a current sensor for measuring the current $I_L$ flowing through the inductor L. The voltage values and the current values measured by the voltage sensors and the current sensor are referred to as detection voltages and detection current, respectively. The detection voltages and the detection current are input to the controller 10.

The controller 10 receives a first detection voltage that is the actually measured voltage between the first electrode and the second electrode of the first capacitor $C_{DC}$ or between a second terminal of the inductor L and the connection node of the first capacitor $C_{DC}$ and the fourth switch $S_4$. The first detection voltage corresponds to an output voltage generated through a step-up operation or an output voltage generated through a step-down operation of the DC-to-DC converter. In the case of the step-up operation, the first detection voltage corresponds to the voltage between the third I/O terminal T21 and the fourth I/O terminal T22 (i.e., the voltage of the first capacitor $C_{DC}$). In the case of the step-down operation, the first detection voltage corresponds to the voltage between the first I/O terminal T11 and the second I/O terminal T12.

The controller 10 compares the first detection voltage against a first voltage instruction value, and calculates a difference therebetween. The first voltage instruction value refers to a target voltage that is set to be output from the DC-to-DC converter. The first voltage instruction value is set by an upper-level controller. In one example, a set value or a preset value may be stored in a storage and may be read by the controller 10, or may be transmitted to the controller 10 from the upper-level controller.

The controller 10 receives a detection voltage $V_{FC}$ that is a measured voltage applied to the second capacitor $C_{FC}$, compares the second detection voltage $V_{FC}$ with a second voltage instruction value that is preset, and calculates a difference therebetween. The second voltage instruction value is preset by the upper-level controller and is about half the voltage of the first capacitor $C_{DC}$. According to one embodiment of the present disclosure, the controller 10 controls an on/off state of each of the switches $S_1$ to $S_4$ on the basis of the product of the actually measured current (i.e. detection current) of the inductor L and the difference between the detection voltage $V_{FC}$ applied to the second capacitor $C_{FC}$ and the second voltage instruction value.

Figure 2:
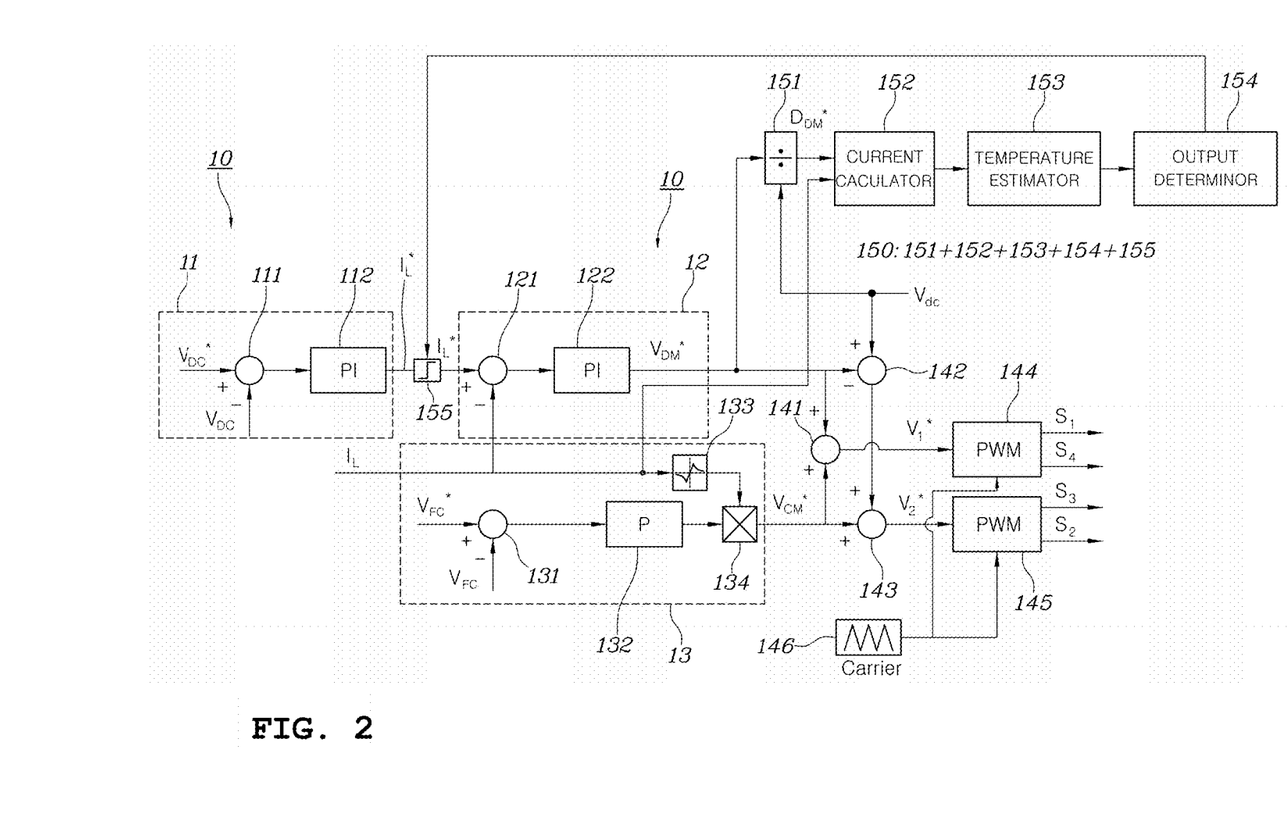
FIG. 2 is a block diagram illustrating in more detail the controller of the DC-to-DC converter according to one embodiment of the present disclosure.

FIG. 2 is a block diagram illustrating in more detail the controller of the DC-to-DC converter according to one embodiment of the present disclosure.

Referring to FIG. 2, the controller 10 of the DC-DC converter according to one embodiment of the present disclosure includes a voltage controller 11, a current controller 12, a flying capacitor voltage controller 13, and a capacitor protector 150.

The voltage controller 11 includes a subtractor 111 and a PI controller 112. The subtractor 111 compares the detection voltage $V_{DC}$ which is an actually measured voltage between the first I/O terminal T11 and the second I/O terminal T12 or the detection voltage $V_{DC}$ which is an actually measured voltage between the third I/O terminal T21 and the fourth I/O terminal T22 with a first voltage instruction value $V_{DC}^*$ that is preset and calculates a difference between the detection voltage $V_{DC}$ and the first voltage instruction value $V_{DC}^*$. The PI controller 112 performs proportional integral control to reduce the difference calculated by the subtractor 111. The PI controller 112 outputs an inductor current instruction value $I_L^*$ indicating a target current of the inductor L, by which the difference calculated by the subtractor 111 can be reduced, by performing the proportional integral control.

The current controller 12 includes a subtractor 121 and a PI controller 122. The subtractor 121 calculates a difference between the inductor current instruction value $I_L^*$ which is provided by the voltage controller 11 and the actual detection current $I_L$ flowing through the inductor L. The PI controller 122 performs proportional integral control to generate a first control voltage instruction value $V_{DM}^*$ that can reduce the output value of the subtractor 121. The first control voltage instruction value $V_{DM}^*$ is used to determine the on-off duty of the switches $S_1$ to $S_4$.

FIG. 2 illustrates an example in which the voltage controller 11 and the current controller 12 perform the proportional integral control. However, the control technique is not limited thereto. Various techniques known in the art may be used.

The flying capacitor voltage controller 12 includes a subtractor 131, a proportional controller 132, a reciprocal calculator 133, and a multiplier 134. The subtractor 131 receives the detection voltage $V_{FC}$ applied to the second capacitor $C_{FC}$, compares the detection voltage $V_{FC}$ with a preset second voltage instruction value $V_{FC}^*$, and calculates a difference therebetween. The proportional controller 132 performs proportional control and outputs a control instruction value to reduce the output value of the subtractor 131. The reciprocal calculator 133 calculates the reciprocal of the measured inductor current $I_L$, and the multiplier 134 multiplies the output value of the proportional controller 132 by the reciprocal output from the reciprocal calculator 133 and outputs the calculated product as a second control voltage instruction value $V_{CM}^*$.

In addition, the controller 10 may further include: an adder 141 that sums the first control voltage instruction value $V_{DM}^*$ output from the current controller 12 and the second control voltage instruction value $V_{CM}^*$ output from the flying capacitor voltage controller 13 and generates a first duty instruction value $V_1^*$; a subtractor 142 that subtracts the first control voltage instruction value $V_{DM}^*$ from the detection voltage $V_{DC}$ detected between the I/O terminals; a second adder 143 that adds the resultant value output from the subtractor 142 to the second control voltage instruction value $V_{CM}^*$; a first switching controller 144 that determines the on/off state of the first and fourth switches $S_1$ and $S_4$ according to a result of comparison between the first duty instruction value $V_1^*$ and a triangular wave signal having a preset frequency generated by the triangular wave generator 146; and a second switching controller 145 that determines the on/off state of the second switch $S_2$ and the third switch $S_3$ according to a result of comparison between the second duty instruction value $V_2^*$ and the triangular wave signal having the preset frequency output from the triangular wave generator 146.

Regarding the configuration described above, the first duty instruction value $V_1^*$ and the second duty instruction value $V_2^*$ are expressed by Equations 1, using the first control voltage instruction value $V_{DM}^*$ and the second control voltage instruction value $V_{CM}^*$.

$$V_1^* = V_{CM}^* + V_{DM}^*$$
$$V_2^* = V_{CM}^* + (V_{DC} - V_{DM}^*)$$

[Equations 1]

Where the first control voltage instruction value $V_{DM}^*$ is a value generated on the basis of the output voltage $V_{DC}$ of the DC-to-DC converter and has an impact on the output, and the second control voltage instruction value $V_{CM}^*$ is a value generated on the basis of the voltage $V_{FC}^*$ of the flying capacitor and has an impact on the voltage $V_{FC}^*$ of the flying capacitor or on the difference $V_{DC} - V_{FC}$ between the output voltage $V_{DC}$ of the DC-to-DC converter and the voltage $V_{FC}$ of the flying capacitor. That is, the first control voltage instruction value $V_{DM}^*$ is used to control the output voltage of the DC-to-DC converter and the second control voltage instruction value $V_{CM}^*$ is used to control the voltage of the flying capacitor.

FIGS. 3 to 6 are diagrams illustrating a flow of current in the DC-to-DC converter according to one embodiment of the present disclosure.

Figure 3:
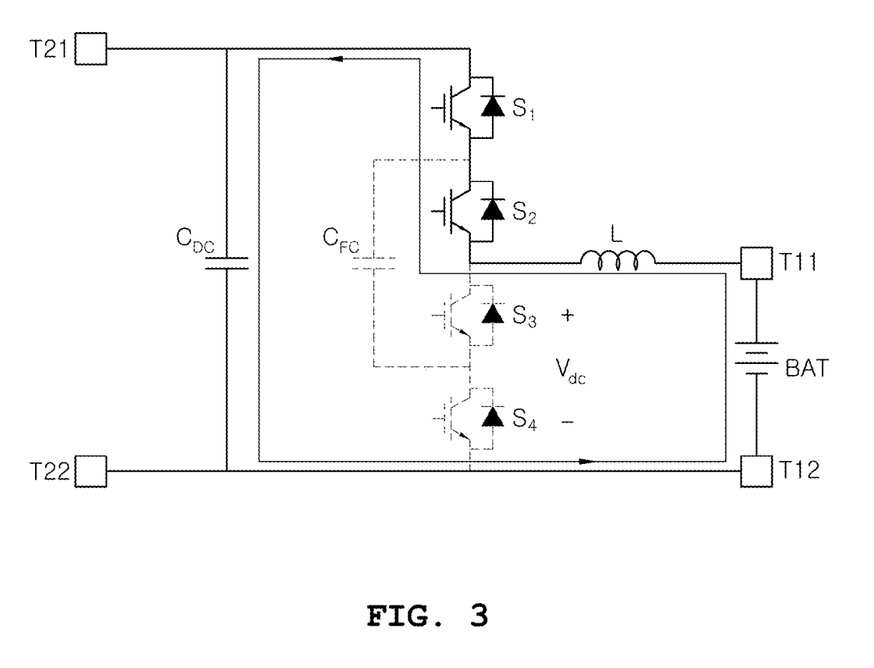
FIGS. 3 to 6 are diagrams illustrating a flow of current in the DC-to-DC converter according to one embodiment of the present disclosure.

FIG. 3 illustrates a first state in which the first switch $S_1$ and the second switch $S_2$ are turned on and the third switch $S_3$ and the fourth switch $S_4$ are turned off. The first state is created when the voltage $V_{DC}$ of the capacitor $C_{DC}$ is fully applied to the connection node of the inductor L and the switch $S_2$ or $S_3$.

Figure 4:
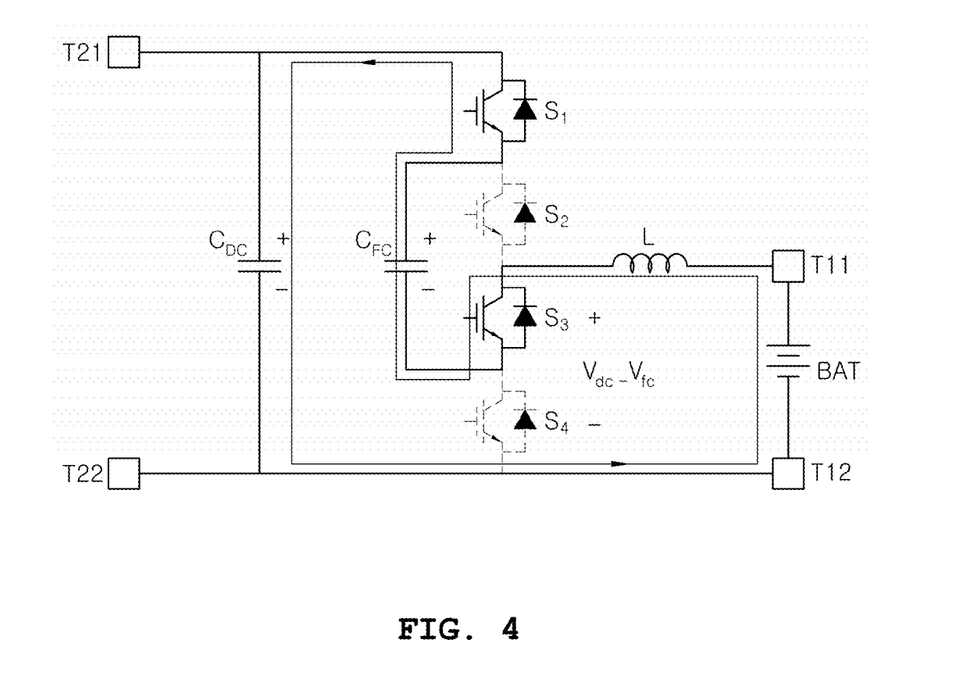

FIG. 4 illustrates a second state in which the first switch $S_1$ and the third switch $S_3$ are turned on and the second switch $S_2$ and the fourth switch $S_4$ are turned off. The second state is created when a voltage corresponding to the difference between the voltage $V_{DC}$ of the capacitor $C_{DC}$ and the voltage $V_{FC}$ of the flying capacitor $C_{FC}$ is applied to the connection node of the inductor L and the switch $S_2$ or $S_3$.

Figure 5:
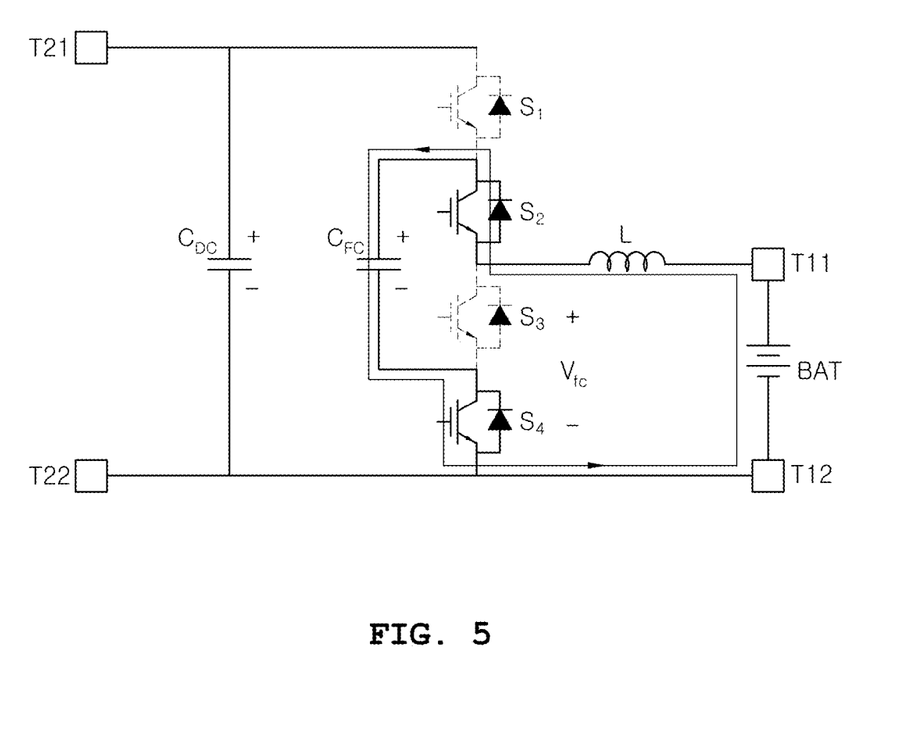

FIG. 5 illustrates a third state in which the second switch $S_2$ and the fourth switch $S_4$ are turned on and the first switch $S_1$ and the third switch $S_3$ are turned off. The third state is created when the voltage $V_{FC}$ of the flying capacitor $C_{FC}$ is applied to the connection node of the inductor L and the switch $S_2$ or $S_3$.

Figure 6:
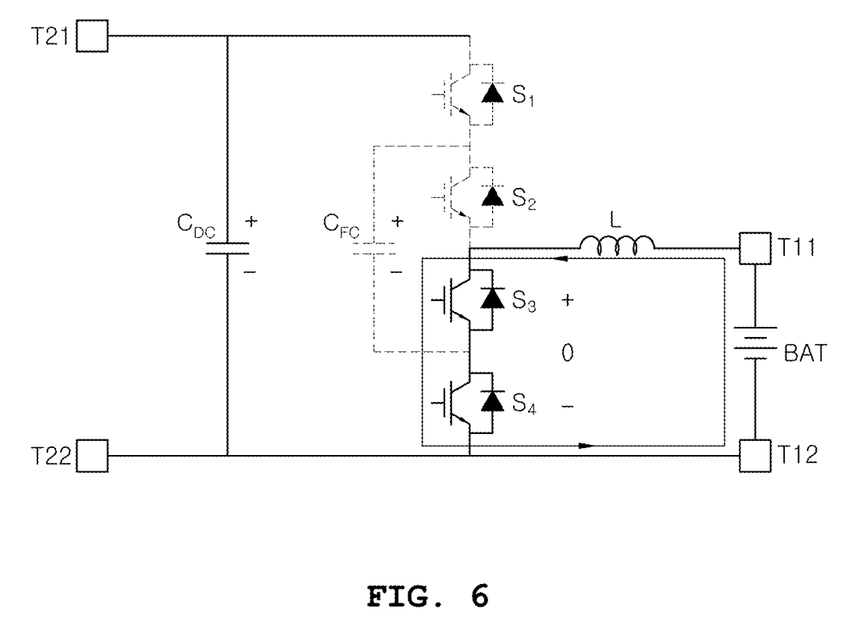

FIG. 6 illustrates a fourth state in which the first switch $S_1$ and the second switch $S_2$ are turned off and the third switch $S_3$ and the fourth switch $S_4$ are turned on. The fourth state is created when no voltage is applied to the connection node of the inductor L and the switch $S_2$ or $S_3$.

Among the states illustrated in FIGS. 3 to 6, in the second and third states in which a current flows through the second capacitor $C_{FC}$ called the flying capacitor $C_{FC}$, the voltage of the flying capacitor $C_{FC}$ changes. During the total duration of the second and third states, the electric energy charged into or discharged from the flying capacitor $C_{FC}$ depends on the current flowing through the inductor L and on a ratio of the second state and the third state.

This can be expressed by Equations 2.

$$I_{FC} = sC_{FC}V_{FC}$$
$$I_{FC} = D_{CM} \cdot I_L$$
$$D_{CM} = (V_{FC}^* - V_{FC}) \cdot K_p$$

[Equations 2]

Where "$D_{CM}$" refers to a duty at which current flows through the flying capacitor $C_{FC}$ and it is determined by the proportional control of the flying capacitor voltage controller 13 and is expressed by the third row in Equations 2. The third row in Equations 2 indicates the duty in the case where the reciprocal of the inductor current $I_L$ is not used. In Equation 2, "$K_p$" refers to a gain of the proportional controller 132.

Equations 2 are summarized into Equation 3, and calculation of a transfer function on the basis of Equation 3 produces Equation 4.

$$(V_{FC}^* - V_{FC}) \cdot K_p \cdot I_L = sC_{FC}V_{FC}$$

[Equation 3]

$$\frac{V_{FC}}{V_{FC}^*} = \frac{\frac{K_p \cdot I_L}{C_{FC}}}{s + \frac{K_p \cdot I_L}{C_{FC}}} = \frac{\omega_{FC}}{s + \omega_{FC}}$$

[Equation 4]

To control the transfer function of Equation 4 in the form of a closed loop of a first-order low pass filter, the relationship of Equation 5 must be established.

$$K_p = \frac{C_{FC} \cdot \omega_{FC}}{I_L}$$

[Equation 5]

Equation 5 shows that the linear control characteristic can be obtained only when the gain for the proportional control is inversely proportional to the inductor current.

Therefore, with the configuration in which the flying capacitor voltage controller 13 includes the reciprocal calculator 133 for obtaining the reciprocal of the inductor current $I_L$, it is possible to obtain a stable control characteristic for the overall current.

Here, the controller in the flying capacitor voltage controller 13 may be implemented with a proportional integral (PI) controller instead of the proportional controller 132. However, when a PI controller is used, the value accumulated in the integrator is likely to generate a large duty pulsation depending on the direction of current. This means that the controllability is greatly deteriorated in the vicinity of the inductor current $I_L$ becoming zero. Therefore, it is preferable to use a proportional controller.

The output voltages in the second state and the third state in which the current flows through the second capacitor (i.e., flying capacitor) $C_{FC}$ are respectively "$V_{DC}$-$V_{FC}$" and "$V_{FC}$". In the normal state, an intermediate voltage $0.5*V_{DC}$ among the outputs of a three-level converter is output.

Therefore, the frequency of utilizations of the second state and the third state increases as the output pole voltage of the flying converter approaches $0.5*V_{DC}$, and the frequency of utilizations of the first state or the third state increases as the output pole voltage of the flying converter differs more largely from $0.5*V_{DC}$. In addition, when the flying capacitor $C_{FC}$ is stably controlled to output a voltage of $0.5*V_{DC}$, the ratio of the second state and the third state is 1:1 (that is, $V_{CM}*=0$).

Figure 7:
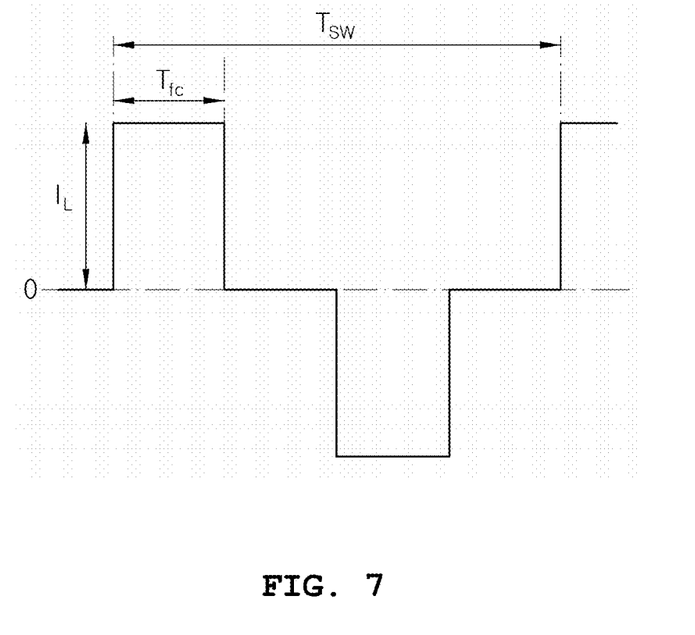
FIG. 7 is a waveform diagram briefly showing a current of a flying capacitor included in the DC-DC converter when the pole voltage of the DC-DC converter illustrated in FIG. 1 is 0.75 times or 0.25 times as high as the output voltage.
Figure 8:
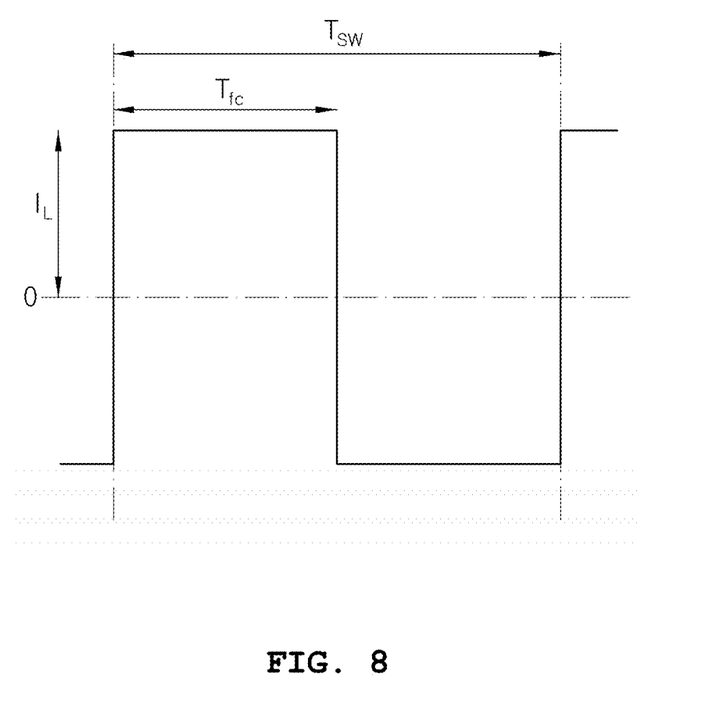
FIG. 8 is a waveform diagram briefly showing a current of a flying capacitor included in the DC-DC converter when the pole voltage of the DC-DC converter 0.5 times as high as the output voltage.

FIG. 7 is a waveform diagram briefly showing the current of the flying capacitor included in the DC-DC converter when the pole voltage of the DC-DC converter illustrated in FIG. 1 is 0.75 times or 0.25 times as high as the output voltage, and FIG. 8 is a waveform diagram briefly showing the current of the flying capacitor included in the DC-DC converter when the pole voltage of the DC-DC converter 0.5 times as high as the output voltage.

In FIGS. 7 and 8, $T_{sw}$ denotes a switching period of the first to fourth switches $S_1$ to $S_4$, $I_L$ denotes an inductor current, and $T_{fc}$ is a duration during which the current flows through the flying capacitor $C_{FC}$.

As illustrated in FIGS. 7 and 8, when a ratio of the during $T_{fc}$ with respect to the total switching period $T_{SW}$ is defined as $D_{fc}$, the ratio $D_{fc}$ can be expressed by Equation 6.

$$D_{fc} = 0.5 - |D_{DM}^* - 0.5| \quad \text{[Equation 6]}$$

Here, $D_{DM}^*$ is a duty value corresponding to the first control voltage instruction value $V_{DM}^*$ output from the current controller and is obtained by dividing the first control voltage instruction value $V_{DM}^*$ by the output voltage $V_{DC}$. Herein, it is referred to as a first control duty.

Figure 9:
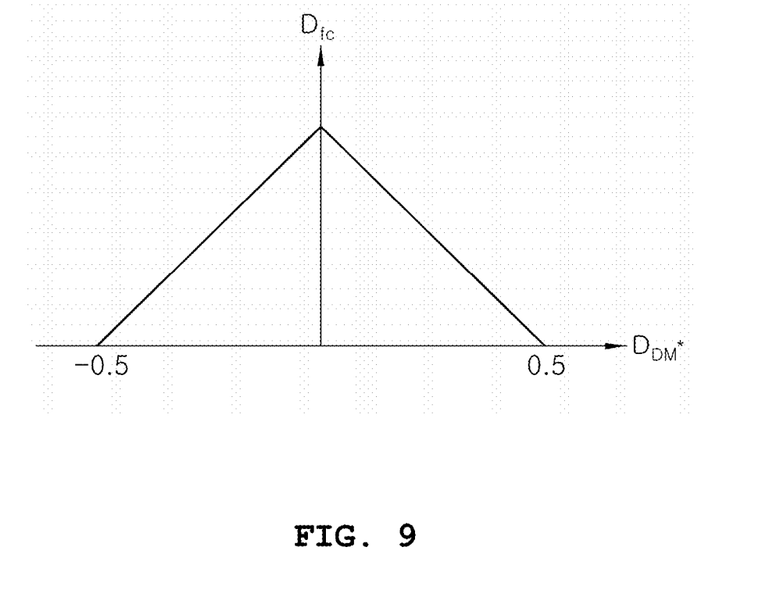
FIG. 9 is a graph showing a ratio of a conduction section of a flying capacitor according to a first control duty corresponding to a value obtained by dividing a first control voltage instruction value by an output voltage of the DC-DC converter shown in FIG. 1.

According to Equation 6, the duty $D_{fc}$ according to the first control duty $D_{DM}^*$ corresponding to a value obtained by dividing the first control voltage instruction value $V_{DM}^*$ by the output voltage $V_{DC}$ can be expressed by FIG. 9.

FIG. 9 is a graph showing a ratio of a conduction section of the flying capacitor according to the first control duty corresponding to a value obtained by dividing the first control voltage instruction value by the output voltage of the DC-DC converter shown in FIG. 1.

In general, the temperature of the capacitor depends on the cooling performance and the amount of heat generated according to the ambient temperature and the temperature coefficient. It is known that the amount of heat generated varies according to the root mean square (RMS) value of the current flowing through the capacitor. That is, there are various known techniques of calculating the amount of heat generated by the capacitor on the basis of the RMS value of the current flowing through the capacitor.

As illustrated in FIGS. 7 and 8, the RMS value in the form of a bipolar pulse train can be calculated by Equation 7.

$$I_{fi,rms} = I_L \sqrt{2D_{fi}} \quad \text{[Equation 7]}$$

When the definition of the duty $D_{fi}$ in Equation 6 is applied to Equation 7, the RMS value $I_{fi,rms}$ of the current flowing through the flying capacitor $C_{FC}$ can be expressed as Equation 8.

$$I_{fi,rms} = I_L \sqrt{2(0.5 - |D_{DM}^* - 0.5|)} = \alpha_{fc} \cdot I_L \quad \text{[Equation 8]}$$

Figure 10:
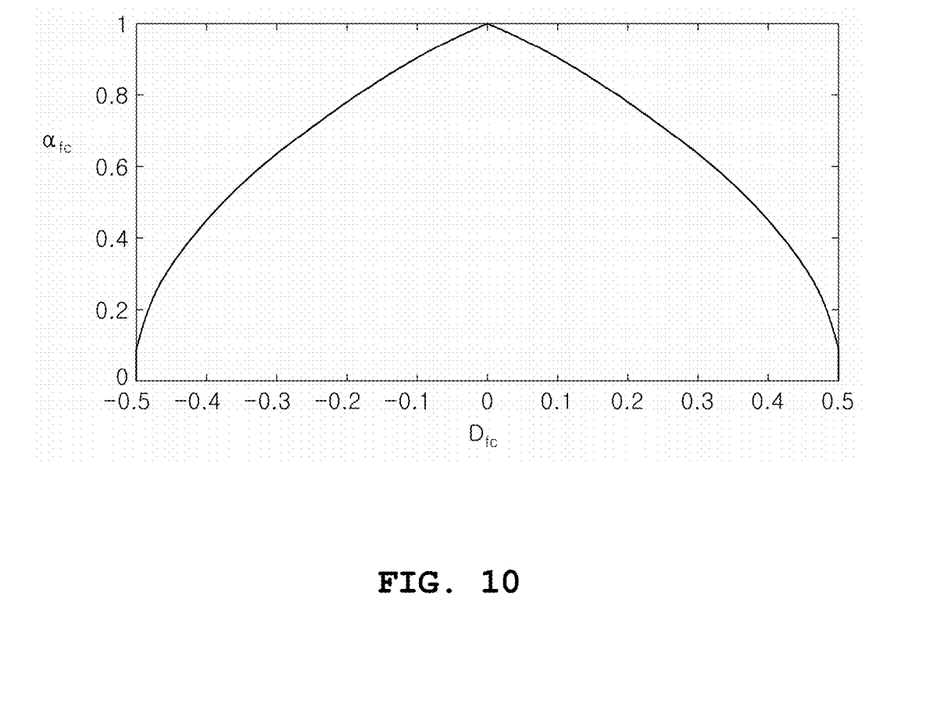
FIG. 10 is a graph showing an RMS determination coefficient of a current of a flying capacitor according to a first control duty corresponding to a value obtained by dividing a first control voltage instruction value by an output voltage of the DC-DC converter illustrated in FIG. 1.

In Equation 8, the current RMS determination coefficient $\alpha_{fc}$ of the flying capacitor can be expressed as a function of the first control duty $D_{DM}^*$ as illustrated in FIG. 10.

FIG. 10 is a graph showing an RMS determination coefficient of a current of a flying capacitor according to a first control duty corresponding to a value obtained by dividing a first control voltage instruction value by an output voltage of the DC-DC converter illustrated in FIG. 1.

As described above, the RMS value of the current of the flying capacitor is determined by the first control duty $D_{DM}^*$ and the inductor current $I_L$. According to one embodiment of the present disclosure, the controller includes further includes a capacitor protector 150. The capacitor protector 150 includes: a divider 151 that divides the first control voltage instruction value $V_{DM}^*$ determined by the current controller 12 to derive the first control duty $D_{DM}^*$ by the output voltage $V_{DC}$; a current calculator 152 that receives the first control duty $D_{DM}^*$ and the detection current $I_L$ of the inductor L and derives the RMS value of the current of the flying capacitor $C_{FC}$ using Equation 8; a temperature estimator 153 that estimates the temperature of the flying capacitor $C_{FC}$ on the basis of the RMS value of the current of the flying capacitor; and an output determiner 154 that determines whether to de-rate the output voltage by comparing the estimated temperature and a reference temperature that is preset.

Here, the temperature estimator 153 may require information such as a coolant temperature (or outdoor air temperature) to estimate the temperature of the capacitor, and calculation for temperature estimation may be performed using various models or techniques known in the art.

In addition, when the output determiner 154 has determined that de-rating is necessary, a de-rating request is transmitted to the upper-level controller that generates a voltage instruction value of the DC-DC converter. The upper-level controller or the like generates a new voltage instruction value for de-rating and provides it to the voltage controller 11. Generally, terms "de-rating" means a control technique that a controller forcibly reduces a performance of a device. In the present disclosure, the terms "de-rating" means that the voltage controller 11 forcibly reduces the output voltage of the converter.

In order for the controller 10 itself to de-rate the output voltage, the capacitor protector 150 further includes a limiter 155 that imposes a limitation on the current instruction value $I_L^*$ output from the voltage controller 11. The limiter 155 limits the output voltage of the DC-DC converter by limiting the current instruction value provided to the current controller 12 to a predetermined level or less.

The aforementioned operations/functions performed by the controller can be embodied as computer readable code/algorithm/software stored on a computer readable recording medium. The computer readable recording medium is any data storage device that can store data which can thereafter be read by a computer or a processor/microprocessor. Examples of the computer readable recording medium include a hard disk drive (HDD), a solid state drive (SSD a silicon disc drive (SDD), read-only memory (ROM), random-access memory (RAM), CD-ROM, magnetic tapes, floppy disks, optical data storage devices, etc.

The aforementioned controller may include one or more processors/microprocessors. The controller may be implemented with circuits. The controller may perform the above described operations/functions, by executing the computer readable code/algorithm/software stored on the computer readable recording medium.

Although the present disclosure has been described with reference to preferred embodiments, the preferred embodiments are presented to describe the technical spirit of the present disclosure only for illustrative purposes and those skilled in the art will appreciate that various modifications and changes are possible, without departing from the scope and spirit of the present disclosure. Therefore, it should be understood that the protection scope of the present disclosure is defined by the accompanying claims rather than the description which is presented above.

What is claimed is:

1. A DC-to-DC converter comprising:
   a first capacitor;
   a first switch, a second switch, a third switch, and a fourth switch connected in series between a first electrode and a second electrode of the first capacitor;
   a second capacitor having a first electrode and a second electrode respectively connected to a connection node of the first switch and the second switch and a connection node of the third switch and the fourth switch;
   an inductor connected to a connection node of the second switch and the third switch at a first terminal thereof; and
   a controller that determines a control duty of the first to fourth switches, estimates a temperature of the second capacitor on the basis of the control duty and a detection current that is an actually measured inductor current, and determines whether to perform de-rating according to the estimated temperature of the second capacitor.

2. The DC-to-DC converter according to claim 1, wherein the controller generates a current instruction value that is a target inductor current to flow through the inductor on the basis of a result of comparison between a first detection voltage that is a measured output voltage of the DC-to-DC converter and an output voltage instruction value that is a target voltage to be output from the DC-to-DC converter, determines the control duty of the first to fourth switches on the basis of a result of comparison between the detection current and the current instruction value, calculates a root mean square (RMS) current of the second capacitor on the basis of the control duty and the detection current, and estimates the temperature of the second capacitor on the basis of the calculated RMS current, and
   wherein the output voltage is a voltage between the first electrode and the second electrode of the first capacitor or a voltage between a second terminal of the inductor and a connection node of the first capacitor and the fourth switch.

3. The DC-to-DC converter according to claim 2, further comprising a voltage sensor for obtaining the measured output voltage.

4. The DC-to-DC converter according to claim 2, wherein the controller calculates the RMS current of the second capacitor using an equation $I_{ft,rms}=I_L\sqrt{2(0.5-|D_{DM}{}^*-0.5|)}$ ($I_{ft,rms}$: the RMS current of the second capacitor, $I_L$: the detection current, and $D_{DM}{}^*$: the detection duty).

5. The DC-to-DC converter according to claim 1, wherein the controller performs the de-rating by imposing a limitation on the current instruction value when the estimated temperature of the second capacitor is higher than a reference temperature that is predetermined.

6. The DC-to-DC converter according to claim 1, wherein the controller outputs a result of a decision about whether to perform the de-rating to an upper-level controller that generates an output voltage instruction value.

7. The DC-to-DC converter according to claim 1, wherein the controller comprises:
   a voltage controller that generates a current instruction value that is a target current to flow through the inductor on the basis of a difference between the first detection voltage and an output voltage instruction value;
   a current controller that generates a first control voltage instruction value on the basis of a difference between the current instruction value and the detection current;
   a flying capacitor voltage controller that generates a second control voltage instruction value on the basis of a difference between the second detection voltage and the second voltage instruction value; and
   a capacitor protector that calculates an RMS current of the second capacitor on the basis of the detection current and the control duty obtained by dividing the first control voltage instruction value by the output voltage, estimates the temperature of the second capacitor on the basis of the calculated RMS current, and determines whether to perform the de-rating according to the estimated temperature of the second capacitor.

8. The DC-to-DC converter according to claim 7, wherein the capacitor protector comprises:
   a divider that calculates the control duty by dividing the first control voltage instruction value by the output voltage;
   a current calculator that calculates the RMS current of the second capacitor on the basis of the control duty and the detection current;
   a temperature estimator that estimates the temperature of the second capacitor according to the RMS current of the second capacitor calculated by the current calculator; and
   an output determiner that determines whether to perform the de-rating according to a result of comparison between the estimated temperature of the second capacitor calculated by the temperature estimator and the predetermined reference temperature.

9. The DC-to-DC converter according to claim 8, wherein when the output determiner determines to perform the de-rating, the capacitor protector further comprises a limiter that imposes a limitation on the current instruction value output from the voltage controller and provides a limited current instruction value to the current controller.

10. The DC-to-DC converter according to claim 8, wherein the output determiner outputs a result of a decision about whether to perform the de-rating to an upper-level controller that generates the output voltage instruction value.

11. The DC-to-DC converter according to claim 8, wherein the current calculator calculates the RMS current of the second capacitor using an equation $I_{ft,rms}=I_L\sqrt{2(0.5-|D_{DM}{}^*-0.5|)}$ ($I_{ft,rms}$: the RMS current of the second capacitor, $I_L$: the detection current, and $D_{DM}{}^*$: the detection duty).

12. The DC-to-DC converter according to claim 1, further comprising a current sensor for obtaining the actually measured inductor current.

\* \* \* \* \*